United States Patent
Jiang et al.

(10) Patent No.: US 11,823,326 B2
(45) Date of Patent: Nov. 21, 2023

(54) IMAGE PROCESSING METHOD

(71) Applicant: CONTEMPORARY AMPEREX TECHNOLOGY CO., LIMITED, Ningde (CN)

(72) Inventors: Guannan Jiang, Ningde (CN); Lili Han, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 18/317,067

(22) Filed: May 13, 2023

(65) Prior Publication Data
US 2023/0281919 A1    Sep. 7, 2023

Related U.S. Application Data

(63) Continuation of application No. PCT/CN2021/126393, filed on Oct. 26, 2021.

(51) Int. Cl.
*G06T 7/00*    (2017.01)
*G06T 7/55*    (2017.01)
(Continued)

(52) U.S. Cl.
CPC .............. *G06T 15/506* (2013.01); *G06T 7/55* (2017.01); *G06T 19/20* (2013.01); *G06T 2207/10028* (2013.01); *G06T 2219/2012* (2013.01)

(58) Field of Classification Search
CPC ......... G06T 15/506; G06T 7/55; G06T 19/20; G06T 2207/10028; G06T 2219/2012
See application file for complete search history.

(56) References Cited

U.S. PATENT DOCUMENTS 8,149,268 B1 * 4/2012 Meyers .................... G06T 7/55
                                                    348/42
8,610,758 B2 * 12/2013 Cheng .................. H04N 13/271
                                                    348/46
(Continued)

FOREIGN PATENT DOCUMENTS

CN    102508259 A    6/2012
CN    103337069 A    10/2013
(Continued)

OTHER PUBLICATIONS

The World Intellectual Property Organization (WIPO) International Search Report and Written Opinion for PCT/CN2021/126393 dated Jul. 12, 2022 15 pages (With Translation).

*Primary Examiner* — Gregory M Desire
(74) *Attorney, Agent, or Firm* — ANOVA LAW GROUP, PLLC

(57) ABSTRACT

An image processing method includes obtaining two-dimensional and three-dimensional images of an object, extracting luminance and depth information from the three-dimensional image to generate luminance and depth image for the object, graying the two-dimensional image to obtain a single-channel grayscale image, selecting at least three same-location points from each of the grayscale and luminance image, calculating a coordinate transformation matrix between the grayscale and luminance images based on coordinates of the at least three same-location points in each of the grayscale and luminance images, and aligning the two-dimensional image with the luminance and depth images based on the coordinate transformation matrix to obtain fused image data. The fused image data includes color information of the two-dimensional image and the luminance and depth information of the three-dimensional image.

14 Claims, 3 Drawing Sheets

(51) Int. Cl.
    *G06T 15/50*     (2011.01)
    *G06T 19/20*     (2011.01)

(56) References Cited

U.S. PATENT DOCUMENTS

| | | | |
|---|---|---|---|
| 9,736,456 B1* | 8/2017 | Chen | H04N 13/264 |
| 11,543,387 B2* | 1/2023 | Böhm | G01N 27/9046 |
| 11,675,068 B2* | 6/2023 | Jiang | G06V 10/803 |
| | | | 382/219 |
| 2014/0320602 A1 | 10/2014 | Govindarao et al. | |

FOREIGN PATENT DOCUMENTS

| | | |
|---|---|---|
| CN | 103930923 A | 7/2014 |
| CN | 109647733 A | 4/2019 |
| CN | 112541886 A | 3/2021 |

* cited by examiner

IMAGE PROCESSING METHOD

CROSS-REFERENCE TO RELATED APPLICATION

This application is a continuation of International Application No. PCT/CN2021/126393, filed on Oct. 26, 2021, the entire content of which is incorporated herein by reference.

TECHNICAL FIELD

The present application relates to the field of image processing, and in particular, to an image processing method and a non-transitory storage medium.

BACKGROUND ART

During industrial generation, a product may have a certain defect due to process and equipment reasons. Therefore, it is necessary to detect whether the product is defective, to improve the yield rate of products. In conventional defect detection methods, manual detection has disadvantages such as low detection efficiency. By means of visual image technologies, the detection efficiency may be improved, and also the cost of human input may be greatly reduced. Current visual detection methods usually employ a CCD camera to obtain two-dimensional (2D) images, which are then used for detection. However, such a detection method using 2D images is not accurate enough, which is likely to lead to missed and false detection of the defects.

SUMMARY

In view of the problems described above, the present application proposes an image processing method and a non-transitory storage medium.

To this end, a first aspect of the present disclosure provides an image processing method, where the image processing method includes:
  obtaining a two-dimensional image and a three-dimensional image of an object;
  extracting luminance information and depth information from the three-dimensional image to generate a luminance image and a depth image for the object;
  graying the two-dimensional image to obtain a single-channel grayscale image;
  selecting at least three same-location points from each of the grayscale image and the luminance image;
  calculating a coordinate transformation matrix between the grayscale image and the luminance image based on coordinates of the at least three same-location points in each of the grayscale image and the luminance image; and
  aligning the two-dimensional image with the luminance image and the depth image based on the coordinate transformation matrix, to obtain fused image data, where the fused image data includes color information of the two-dimensional image and the luminance information and depth information of the three-dimensional image.

In an embodiment of the present application, the two-dimensional image is grayed to obtain the single-channel grayscale image. The coordinate transformation matrix between the two-dimensional image and the three-dimensional image is then solved. Features of the two-dimensional image are aligned with those of the three-dimensional image, such that feature data of the two-dimensional image is aligned with that of the three-dimensional image, so as to obtain the fused image data. In this way, image fusion of the two-dimensional image with the three-dimensional image is implemented. Such fused image data may provide more information for subsequent deep learning model analysis, thereby obtaining a more accurate detection result.

In embodiments of the present application, the purpose of graying is to facilitate alignment of the features in the two-dimensional image with those in the three-dimensional image. In some embodiments, a weighted average method may be used to gray a color image with three (RGB) channels. Specifically, a grayscale value may be calculated according to the following formula:

$$p = w_1 R + w_2 G + w_3 B$$

where p represents a grayscale value of a coordinate point, R represents a red value of the coordinate point, $w_1$ represents a weight of the red value, G represents a green value of the coordinate point, $w_2$ represents a weight of the green value, B represents a blue value of the coordinate point, and $w_3$ represents a weight of the blue value. Research shows that human eyes are most sensitive to green, followed by red, and are least sensitive to blue. Therefore, in some embodiments, $w_2 > w_1 > w_3$ may be set. In some embodiments, $w_1$ may be set to 0.299, $w_2$ may be set to 0.587, and $w_3$ may be set to 0.114. This is because experiments and theories proof that using such weight settings may obtain psychological grayscales that best match perception of human eyes. Red, green, and blue information of the image are fully preserved in grayscale values obtained by using the weighted average method. It should be understood that graying may be performed using other methods, such as a component method, a maximum method, an average method and a gamma correction method.

In some embodiments, the at least three same-location points are points of the object with specificity. These points with specificity are particular locations in patterns that are within the image and may be obtained by analysis of the patterns. Therefore, selection of the at least three same-location points may be implemented using artificial intelligence algorithms.

In some embodiments, the at least three same-location points include three non-collinear reference points. When the three reference points are collinear, the coordinate transformation matrix cannot be obtained from coordinates of the three reference points. Therefore, the at least three same-location points are required to include three non-collinear reference points.

In some embodiments, a maximum interior angle of a triangle formed by the three reference points is not greater than 160°. The larger the maximum interior angle of the triangle formed by the three reference points is, the more the three reference points tend to be collinear. Small sampling errors may cause the three reference points to tend to be collinear, such that the coordinate transformation matrix obtained based on the coordinates of the three reference points in each of the grayscale image and the luminance image is ineffective. Therefore, the maximum interior angle of the triangle formed by the three reference points is set to not greater than 160°, which improves the reliability of the coordinate transformation matrix.

In some specific embodiments, the image processing method includes:
  aligning, the luminance image and the depth image with the two-dimensional image based on the coordinate transformation matrix by using coordinates in the two-dimensional image as a reference; and using, as information of three channels respectively, grayscale information of the grayscale image, and the luminance information and the depth information that are aligned to the coordinates in the two-dimensional image, to generate a fused image containing the information of the three channels.

It should be understood that one embodiment of the present application is to align the luminance image and the depth image obtained from the three-dimensional image with the two-dimensional image by using the coordinates in the two-dimensional image as a reference. It can be conceived by those skilled in the art that aligning the two-dimensional image with the luminance image, that is, aligning the two-dimensional image to the three-dimensional image by using coordinates in the luminance image as a reference implements alignment of the two-dimensional image with the three-dimensional image, and further completes data alignment of the two images. However, the resolution of the three-dimensional image is low, so the luminance image and the depth image are aligned to the two-dimensional image. Moreover, it should be understood that it is only needed to align information of the two-dimensional image with that of the three-dimensional image, and store color information, luminance information, and depth information, etc. for each coordinate in the image, rather than synthesizing the fused image containing the information of the three channels.

In some embodiments, the color information, the luminance information, and the depth information may be channel stacked to obtain an image having information of multiple channels. In some other embodiments, the color information, the luminance information, and the depth information may be fused by weighting to obtain an image having information of a single channel or multiple channels.

In some specific embodiments, before the two-dimensional image is aligned with the luminance image and the depth image, depth values in the depth image are normalized to generate a normalized depth image. Depth values in the generated depth image may be very large, e.g., ten thousand or above, thus by means of normalization, the depth values may be limited between 0 and 1, which facilitates subsequent calculation and processing. In some embodiments, the depth values in the depth image may be normalized according to the following formula:

$$d_s = \frac{d - d_{min}}{d_{max} - d_{min}}$$

where d represents a depth value of a coordinate point in the depth image, $d_{min}$ represents a minimum depth value in the depth image, $d_{max}$ represents a maximum depth value in the depth image, and ds represents a normalized depth value of the coordinate point in the depth image. In some embodiments, the object described above is any one selected from the following: a battery surface, a battery top cover weld, and a battery sealing pin. The embodiments of the present application are applicable to a scenario where both a two-dimensional image and a three-dimensional image are required for defect detection. During battery production, detection procedures of scratches on the battery surface, defects of the battery top cover weld, and defects of the sealing pin weld are all important for ensuring safety of a battery after leaving the factory. The two-dimensional image cannot directly reflect depth information of related parts of the battery, and therefore effective imaging of depth-sensitive features cannot be implemented, while the three-dimensional image has low resolution and cannot cover all target features. Therefore, the scratches on the battery surface, the defects of the battery top cover weld, and the defects of the sealing pin weld may be detected by using the image processing method according to the present application, so as to obtain fused image data for corresponding feature detection.

In some embodiments, the two-dimensional image and the three-dimensional image described above may be images acquired at different positions of a production line. However, in some other embodiments, the two-dimensional image and the three-dimensional image described above may be images acquired at the same position of a production line.

In some embodiments, the two-dimensional image and the three-dimensional image described above may be images of the same object taken at a consistent angle. However, in some other embodiments, the two-dimensional image and the three-dimensional image described above may be images of the same object taken at different angles.

A second aspect of the present application provides a non-transitory storage medium storing instructions, where the instructions, when executed by a processor, cause the processor to perform the image processing method of the first aspect described above.

A third aspect of the present application provides an appearance detection method, including:
  obtaining fused image data of a plurality of objects according to the image processing method of the first aspect described above;
  obtaining defect determining results of the plurality of objects;
  using the fused image data and the defect determining results of the plurality of objects to iteratively train a deep learning algorithm model, to update the deep learning algorithm model;
  acquiring a two-dimensional image and a three-dimensional image of a target object;
  fusing the two-dimensional image and the three-dimensional image of the target object according to the image processing method of the first aspect described above, to obtain fused image data of the target object; and
  inputting the fused image data of the target object into an updated deep learning algorithm model, to obtain a defect determining result of the target object.

In embodiments of the present application, the defect determining result of the target object is obtained by substituting the fused image data of the target object into the trained model. Thus, the accuracy of the detection is improved and missed and false detection (false positive) of defects are reduced. At the same time, since the fused image data is substituted into one model for calculation and analysis, there is no need to construct two models or respectively substitute data of different images into the two models for calculation and analysis, thereby saving computing resources and increasing a detection speed. Moreover, since the fused image data is used, only one model rather than two models need to be trained in advance.

In some embodiments, the fused image data of the target object includes grayscale information, luminance information, and depth information of the target object, and the deep learning algorithm model described above includes a grayscale data input channel, a luminance data input channel, and a depth data input channel. In the embodiments of the present application, the deep learning algorithm model may include three data input channels, and the model detects, based on input grayscale information, luminance information, and depth information, whether there is a defect.

In some embodiments, the deep learning algorithm model described above includes a red data input channel, a green data input channel, a blue data input channel, a luminance data input channel, and a depth data input channel. In the embodiments of the present application, the deep learning algorithm model may include five data input channels, and the model detects, based on input color information, luminance information, and depth information, whether there is a defect. It should be understood that, in practice, those skilled in the art may choose the number of data channels of the model according to actual requirements.

In some embodiments, the acquired two-dimensional image of the target object includes multiple two-dimensional images.

In some embodiments, the acquired three-dimensional image of the target object includes multiple three-dimensional images.

A fourth aspect of the present application provides a non-transitory storage medium storing instructions, where the instructions, when executed by a processor, cause the processor to perform the appearance detection method of the third aspect described above.

BRIEF DESCRIPTION OF THE DRAWINGS

In order to illustrate the technical solutions of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts. In the drawings.

DETAILED DESCRIPTION OF EMBODIMENTS

Figure 1:
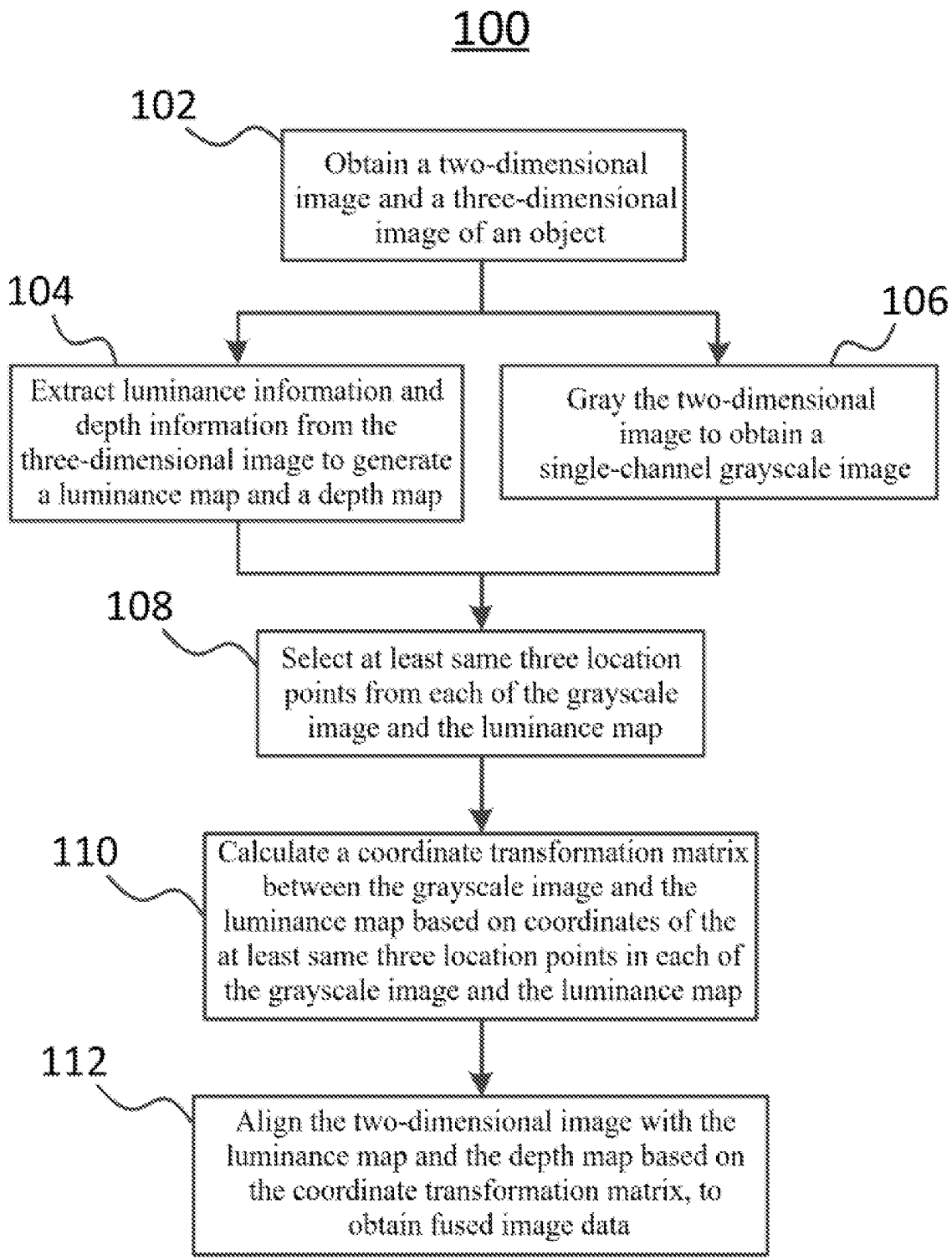
FIG. 1 illustrates a flowchart of an image processing method according to an embodiment of the present application.

Embodiments of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific implementations, but are not intended to limit the present application. The terms "comprising" and "having" and any variations thereof in the description and the claims of the present application as well as the brief description of the accompanying drawings described above are intended to cover non-exclusive inclusion.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

If steps are stated in sequence in the description or in the claims, this does not necessarily mean an embodiment or aspect is limited to the stated sequence. Conversely, it may be envisaged that the steps are performed in a different sequence or in parallel to each other, unless one step is established on another, which absolutely requires the established step to be performed subsequently (this will be clear in an individual case). Therefore, the stated sequence may be an embodiment.

The inventors of the present application have found in practice that since a 2D image cannot not directly reflect depth information of each part of a product and cannot fully cover defect forms in the product, current methods for detecting product defects using a 2D image easily leads to missed and false detection of defects. Moreover, the inventors have also recognized that a 3D image acquired by using a three-dimensional (3D) camera has low resolution, and also cannot fully cover defect forms in the product, which easily leads to missed and false detection of defects. The inventors have conceived that, since the 2D image has enough resolution, it may be used to preliminarily detect product defects, and then the 3D image is used to re-detect the product defects, to eliminate false detection (false positive) and add missed defects.

Still further, the inventors have realized that, if features of the 2D image and the 3D image are extracted and respectively substituted into two different neural network models for analysis, two times of analysis need to be performed, and the two neural network models needs to be trained in advance. On this basis, the inventors have conceived to fuse the 2D image with the 3D image to obtain fused image data and substitute the data into a signal neural network model for analysis. Therefore, the required computing resources are reduced, and the analysis speed and the efficiency are improved.

FIG. 1 illustrates a flowchart of an image processing method 100 according to an implementation of the present application. As shown in FIG. 1, in step 102, a two-dimensional image and a three-dimensional image of an object are obtained. In step 104, luminance information and depth information are then extracted from the three-dimensional image to generate a luminance image and a depth image. In step 106, the two-dimensional image is grayed to obtain a single-channel grayscale image, to facilitate alignment of features in the two-dimensional image with those in the three-dimensional image. In step 108, after the luminance image and the grayscale image are obtained, at least three same-location points are selected from each of the grayscale image and the luminance image. A same-location point in an image refers to a point having a same relative location in the image as a corresponding point in the other image. For example, a same-location point in the grayscale image and the corresponding same-location point in the luminance image have the same relative location (e.g., coordinate) in the respective images. In step 110, a coordinate transformation matrix between the grayscale image and the luminance image is calculated based on coordinates of the at least three same-location points in each of the grayscale image and the luminance image.

It should be understood by those skilled in the art that the same feature point in images acquired by using two different cameras has different image point coordinates. Since product forms in images taken by using different cameras have the same flatness and parallelism, a coordinate transformation between image point coordinates of the different cameras is an affine transformation, with the following matrix transformation equation:

$$\begin{bmatrix} qx \\ qy \\ 1 \end{bmatrix} = \begin{bmatrix} a_1 & b_1 & c_1 \\ a_2 & b_2 & c_1 \\ 0 & 0 & 1 \end{bmatrix} \begin{bmatrix} px \\ py \\ 1 \end{bmatrix}$$

where (px, py) represents image point coordinates of one camera, (qx, qy) represents image point coordinates of the other camera, and $a_1$, $b_1$, $c_1$, $a_2$, $b_2$, and $c_2$ represent transformation coefficients in the coordinate transformation matrix. Such affine transformation has six transformation coefficients, i.e., six degrees of freedom. Therefore, three groups of points are required to calculate the transformation coefficients in the coordinate transformation matrix.

In step 112, after the coordinate transformation matrix is calculated, the two-dimensional image is aligned with the luminance image and the depth image based on the coordinate transformation matrix, to obtain fused image data. In an embodiment of the present application, the two-dimensional image is grayed to obtain the single-channel grayscale image. The coordinate transformation matrix between the two-dimensional image and the three-dimensional image is then solved. Features of the two-dimensional image are aligned with those of the three-dimensional image, such that feature data of the two-dimensional image is aligned with that of the three-dimensional image, so as to obtain the fused image data. In this way, image fusion of the two-dimensional image with the three-dimensional image is implemented. Such fused image data may provide more information for subsequent deep learning model analysis, thereby obtaining a more accurate detection result.

Figure 2:
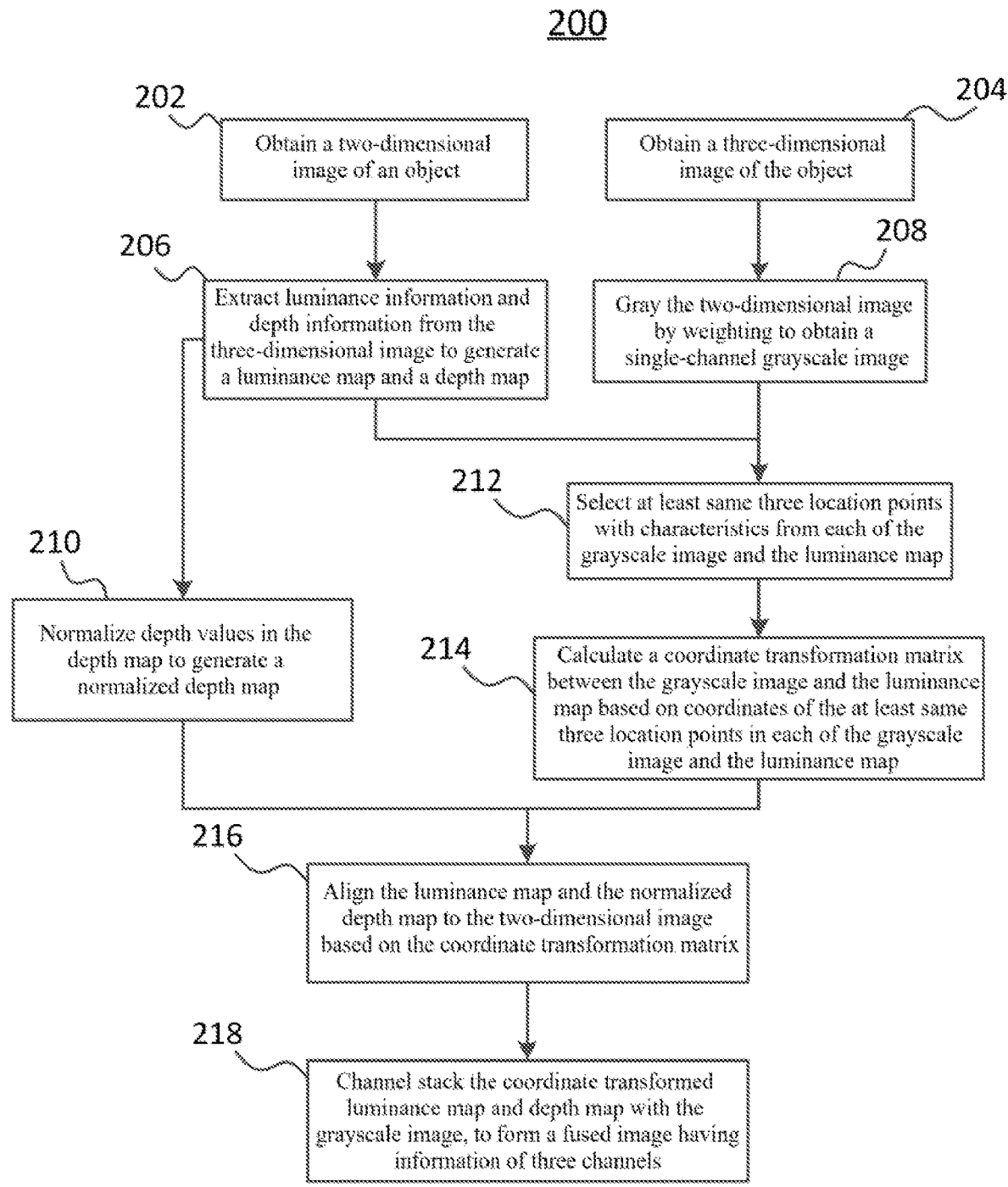
FIG. 2 illustrates a flowchart of an image processing method according to an embodiment of the present application.
Figures 3A, 3B, 3C, 3D:
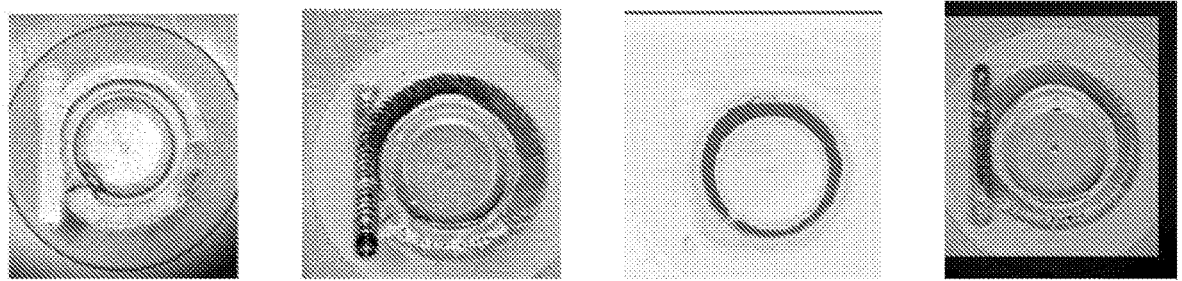
FIGS. 3a to 3d show pictures of a two-dimensional image, a luminance image, a depth image and a fused image according to an embodiment of the present application.

FIG. 2 illustrates a flowchart of an image processing method according to an embodiment of the present application. As shown in FIG. 2, in step 202, a three-dimensional image of an object is obtained. In step 206, luminance information and depth information are extracted from the three-dimensional image to generate a luminance image and a depth image, as shown in FIGS. 3b and 3c. Then, in step 210, depth values in the depth image are normalized to generate a normalized depth image. In some embodiments, the depth values in the depth image may be normalized according to the following formula:

$$d_s = \frac{d - d_{min}}{d_{max} - d_{min}}$$

where d represents a depth value of a coordinate point in the depth image, $d_{min}$ represents a minimum depth value in the depth image, $d_{max}$ represents a maximum depth value in the depth image, and ds represents a normalized depth value of the coordinate point in the depth image. Depth values in the depth image generated in step 206 may be very large, e.g., ten thousand or above, thus by means of normalization, the depth values may be limited between 0 and 1, which facilitates subsequent calculation and processing.

In step 204, a two-dimensional image of the object, as shown in FIG. 3a, is obtained. Then, in step 208, the two-dimensional color image with three (RGB) channels is grayed by weighting to obtain a single-channel grayscale image. Specifically, a grayscale value may be $$p = w_1 R + w_2 G + w_3 B$$

where p represents a grayscale value of a coordinate point, R represents a red value of the coordinate point, $w_1$ represents a weight of the red value, G represents a green value of the coordinate point, $w_2$ represents a weight of the green value, B represents a blue value of the coordinate point, and $w_3$ represents a weight of the blue value. Research shows that human eyes are most sensitive to green, followed by red, and are least sensitive to blue. Therefore, in some embodiments, $w_2 > w_1 > w_3$ may be set. In some embodiments, $w_1$ may be set to 0.299, $w_2$ may be set to 0.587, and $w_3$ may be set to 0.114. This is because experiments and theories proof that using such weight settings may obtain psychological grayscales that best match perception of human eyes. Obtaining the grayscale value by using a weighted average method is easily implemented using algorithms with a relatively small calculation amount. In addition, red, green, and blue information of the image are fully preserved. It should be understood that graying may be performed using other methods, such as a component method, a maximum method, an average method and a gamma correction method.

It should be understood that, as shown in FIG. 2, step 202, step 206 and step 210 may be performed before, after, or when step 204 and step 208 are performed. In step 212, after steps 206 and 208 are completed, at least three same-location points with specificity may be selected from each of the grayscale image and the luminance image. These points with specificity are particular locations in patterns that are within the image and may be obtained by analysis of the patterns. Therefore, selection of the three same-location points with specificity may be implemented using artificial intelligence algorithms. FIGS. 3a to 3d illustrate an embodiment of welding defect detection of a lithium battery sealing pin, according to the present application. In this embodiment, in the figures, two central points of angles between a straight weld and a circular weld, and the center point on the sealing pin may be selected as the three same-location points with specificity. The three same-location points are non-collinear (i.e., they are not on the same straight line, and such points are also referred as "non-collinear points"), so as to meet calculation requirements of transformation coefficients in a coordinate transformation matrix.

In some embodiments, a maximum interior angle of a triangle formed by the three same-location points is not greater than 160°. The larger the maximum interior angle of the triangle formed by the three same-location points is, the more three reference points tend to be collinear. Small sampling errors may cause the three same-location points to tend to be collinear, such that the coordinate transformation matrix obtained based on the coordinates of the three same-location points in each of the grayscale image and the luminance image is ineffective. Therefore, the maximum interior angle of the triangle formed by the three same-location points is set to not greater than 160°, which improves the reliability of the coordinate transformation matrix. When the three same-location points do not meet the requirement that the points are non-collinear or the requirement that the maximum interior angle of the formed triangle is not greater than 160°, more same-location points may be selected, as long as three reference points from the selected same-location points meet either of the requirements above.

In step 214, a coordinate transformation matrix between the grayscale image and the luminance image is calculated based on coordinates of the three same-location points in each of the grayscale image and the luminance image. Step 214 is similar to step 110 in FIG. 1, and related content will not be repeated herein.

In step 216, after the coordinate transformation matrix is calculated, the luminance image and the normalized depth image are aligned to the two-dimensional image based on the coordinate transformation matrix. In this way, data alignment of the same-location points can be implemented in the dimension of pixels of the two-dimensional image, and thus, the effectiveness and accuracy of information fusion is ensured.

Finally, in step 218, the coordinate transformed luminance image and depth image are channel stacked with the grayscale image, to form a fused image having information of three channels, as shown in FIG. 3d. Moreover, it should be understood that it is only necessary to align information of the two-dimensional image with that of the three-dimensional image in coordinates, and store color information, luminance information, and depth information, etc. for each coordinate in the image, rather than synthesizing the fused image containing the information of the three channels. In some other embodiments, the color information, the luminance information, and the depth information may alternatively be fused by weighting to obtain an image having information of a single channel or multiple channels.

The image processing method of the present application is applicable to a scenario where both a two-dimensional image and a three-dimensional image are required for defect detection. During battery production, detection procedures of scratches on the battery surface, defects of the battery top cover weld, and defects of the sealing pin weld are all important for ensuring safety of a battery after leaving the factory. The two-dimensional image cannot directly reflect depth information of related parts of the battery, and therefore effective imaging of depth-sensitive features cannot be implemented, while the three-dimensional image has low resolution and cannot cover all target features. Therefore, the scratches on the battery surface, the defects of the battery top cover weld, and the defects of the sealing pin weld may be detected by using the image processing method according to the present application, so as to obtain fused image data for corresponding feature detection. FIGS. 3a to 3d illustrate an embodiment of welding defect detection of a lithium battery sealing pin, according to the present application. However, it should be understood that the object in the image processing method of the present application may alternatively be a battery surface, a battery top cover weld, etc. In the embodiment illustrated in FIGS. 3a to 3d, the two-dimensional image in FIG. 3a and the three-dimensional image corresponding to FIGS. 3b and 3c are images acquired at different positions of a production line. However, in some other embodiments, the two-dimensional image and the three-dimensional image may be images acquired at the same position of a production line.

Figure 4:
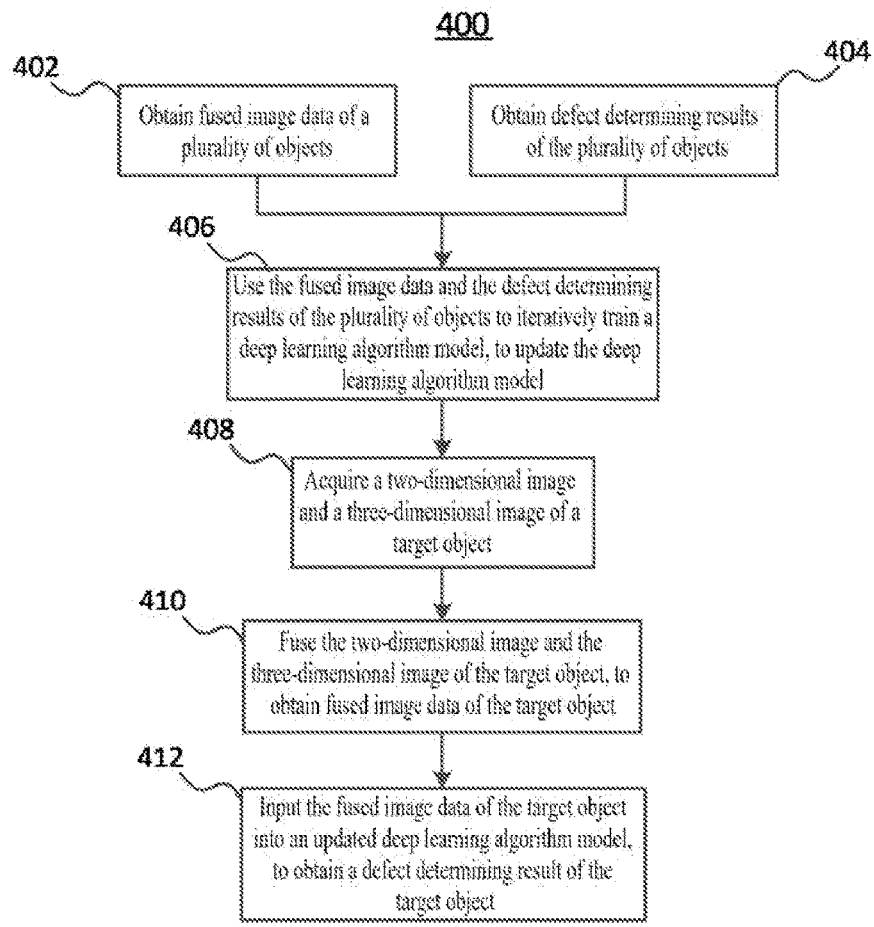
FIG. 4 illustrates a flowchart of an appearance detection method according to an embodiment of the present application.

FIG. 4 illustrates a flowchart of an appearance detection method according to an embodiment of the present application. As shown in FIG. 4, in step 402, fused image data of a plurality of objects are obtained according to an image processing method according to the present application. In step 404, defect determining results of the plurality of objects are obtained. The defect determining results obtained in step 404 are determined by visual inspectors. Then, in step 406, the fused image data and the defect determining results of the plurality of objects are used to iteratively train a deep learning algorithm model, update the deep learning algorithm model. In step 408, after a useful deep learning algorithm model is obtained through training, a two-dimensional image and a three-dimensional image of a target object are acquired. In step 410, the two-dimensional image and the three-dimensional image of the target object are fused according to an image processing method according to the present application, to obtain fused image data of the target object. Finally, in step 412, the fused image data of the target object is input into an updated deep learning algorithm model to obtain a defect determining result of the target object.

In the embodiment illustrated in FIG. 4, the defect determining result of the target object is obtained by substituting the fused image data of the target object into the trained model. Thus, the accuracy of the detection is improved and missed and false detection (false positive) of defects are reduced. At the same time, since the fused image data is substituted into one model for calculation and analysis, there is no need to construct two models or respectively substitute data of different images into the two models for calculation and analysis, thereby saving computing resources and increasing a detection speed. Moreover, since the fused image data is used, only one model rather than two models need to be trained in advance.

In some embodiments, the fused image data of the target object described above includes grayscale information, luminance information, and depth information of the target object, and the deep learning algorithm model described above includes a grayscale data input channel, a luminance data input channel, and a depth data input channel. In this embodiment, the deep learning algorithm model may include three data input channels, and the model detects, based on input grayscale information, luminance information, and depth information, whether there is a defect.

In some embodiments, the deep learning algorithm model described above includes a red data input channel, a green data input channel, a blue data input channel, a luminance data input channel, and a depth data input channel. In this embodiment, the deep learning algorithm model may include five data input channels, and the model detects, based on input color information, luminance information, and depth information, whether there is a defect. It should be understood that, in practice, those skilled in the art may choose the number of data channels of the model according to actual requirements.

Although the present disclosure has been described with reference to embodiments, various modifications may be made thereto and components therein may be replaced with equivalents without departing from the scope of the present disclosure. In particular, the technical features mentioned in the embodiments can be combined in any manner, provided that there is no structural conflict. The present disclosure is not limited to the specific embodiments disclosed herein but includes all the technical solutions that fall within the scope of the claims.

What is claimed is:

1. An image processing method, comprising:
    obtaining a two-dimensional image and a three-dimensional image of an object;
    extracting luminance information and depth information from the three-dimensional image to generate a luminance image and a depth image for the object;
    graying the two-dimensional image to obtain a single-channel grayscale image;

selecting at least three same-location points from each of the grayscale image and the luminance image;

calculating a coordinate transformation matrix between the grayscale image and the luminance image based on coordinates of the at least three same-location points in each of the grayscale image and the luminance image; and aligning the two-dimensional image with the luminance image and the depth image based on the coordinate transformation matrix, to obtain fused image data, wherein the fused image data comprises color information of the two-dimensional image and the luminance information and the depth information of the three-dimensional image.

2. The image processing method according to claim 1, wherein the at least three same-location points are points of the object with specificity.

3. The image processing method according to claim 1, wherein the at least three same-location points comprise three non-collinear reference points.

4. The image processing method according to claim 3, wherein a maximum interior angle of a triangle formed by the three reference points is not greater than 160°.

5. The image processing method according to claim 1, wherein aligning the two-dimensional image with the luminance image and the depth image to obtain fused image data comprises:

aligning the luminance image and the depth image with the two-dimensional image based on the coordinate transformation matrix using coordinates in the two-dimensional image as reference; and generating a fused image containing three-channel information using grayscale information of the grayscale image, and the luminance information and the depth information that are aligned to the coordinates in the two-dimensional image, as information of three channels, respectively.

6. The image processing method according to claim 1, further comprising, before aligning the two-dimensional image with the luminance image and the depth image:

normalizing depth values in the depth image to generate a normalized depth image.

7. The image processing method according to claim 1, wherein the object is one selected from: a battery surface, a battery top cover weld, and a battery sealing pin.

8. A non-transitory storage medium storing instructions that, when executed by a processor, cause the processor to:

obtain a two-dimensional image and a three-dimensional image of an object;

extract luminance information and depth information from the three-dimensional image to generate a luminance image and a depth image for the object;

gray the two-dimensional image to obtain a single-channel grayscale image;

select at least three same-location points from each of the grayscale image and the luminance image;

calculate a coordinate transformation matrix between the grayscale image and the luminance image based on coordinates of the at least three same-location points in each of the grayscale image and the luminance image; and align the two-dimensional image with the luminance image and the depth image based on the coordinate transformation matrix, to obtain fused image data, wherein the fused image data comprises color information of the two-dimensional image and the luminance information and the depth information of the three-dimensional image.

9. The non-transitory storage medium according to claim 8, wherein the at least three same-location points are points of the object with specificity.

10. The non-transitory storage medium according to claim 8, wherein the at least three same-location points comprise three non-collinear reference points.

11. The non-transitory storage medium according to claim 10, wherein a maximum interior angle of a triangle formed by the three reference points is not greater than 160°.

12. The non-transitory storage medium according to claim 8, wherein the instructions further cause the processor to align the two-dimensional image with the luminance image and the depth image to obtain fused image data by:

aligning the luminance image and the depth image with the two-dimensional image based on the coordinate transformation matrix using coordinates in the two-dimensional image as reference; and generating a fused image containing three-channel information using grayscale information of the grayscale image, and the luminance information and the depth information that are aligned to the coordinates in the two-dimensional image, as information of three channels, respectively.

13. The non-transitory storage medium according to claim 8, wherein the instructions further cause the processor to, before aligning the two-dimensional image with the luminance image and the depth image:

normalize depth values in the depth image to generate a normalized depth image.

14. The non-transitory storage medium according to claim 8, wherein the object is one selected from: a battery surface, a battery top cover weld, and a battery sealing pin.

* * * * *